(12) United States Patent
Lee et al.

(10) Patent No.: US 7,407,431 B2
(45) Date of Patent: Aug. 5, 2008

(54) OPTICAL FIBER POLISHING AND FINISHING SYSTEM, DEVICE AND METHOD

(75) Inventors: Woo Ho Lee, Flower Mound, TX (US); Jeongsik Sin, Keller, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/481,484

(22) Filed: Jul. 6, 2006

(65) Prior Publication Data

US 2007/0042683 A1  Feb. 22, 2007

Related U.S. Application Data

(60) Provisional application No. 60/595,463, filed on Jul. 7, 2005.

(51) Int. Cl.
*B24B 49/00* (2006.01)

(52) U.S. Cl. .............................. 451/5; 451/11; 451/364

(58) Field of Classification Search ................ 451/5, 451/11, 41, 364
See application file for complete search history.

(56) References Cited

U.S. PATENT DOCUMENTS

| | | | | |
|---|---|---|---|---|
| 4,776,136 A | * | 10/1988 | Abendschein et al. | ....... 451/364 |
| 5,216,846 A | * | 6/1993 | Takahashi | ..................... 451/57 |
| 5,503,590 A | * | 4/1996 | Saitoh et al. | ................... 451/11 |
| 6,102,785 A | * | 8/2000 | Chandler et al. | ............ 451/271 |
| 6,257,971 B1 | * | 7/2001 | Takahashi et al. | ............ 451/365 |
| 6,547,653 B2 | * | 4/2003 | Yamada et al. | .............. 451/364 |
| 7,001,080 B2 | * | 2/2006 | Minami et al. | ................. 385/85 |

* cited by examiner

*Primary Examiner*—Dung Van Nguyen
(74) *Attorney, Agent, or Firm*—Gandere Wynne Sewell LLP

(57) ABSTRACT

A method, device and system for polishing and/or finishing one or more optical fibers. The method comprising securing an optical fiber connector to at least one holder, generating a tilting motion at the end of the optical fiber, adjusting the tilting motion of the optical fiber to create the desired optical fiber end shape and positioning a stage to provide planar motion to the at least one holder. A desired tilting motion of the optical fiber is generated by adjusting tension of at least one spring in operable connection with the at least one holder. Further adjustments to the tilting motion may be accomplished by further changes in tension of the at least one spring. A desired fiber optic end shape may be provided by the method, system and device described herein. Such shapes include dome, circular, or flat.

25 Claims, 3 Drawing Sheets

FIG. 4A
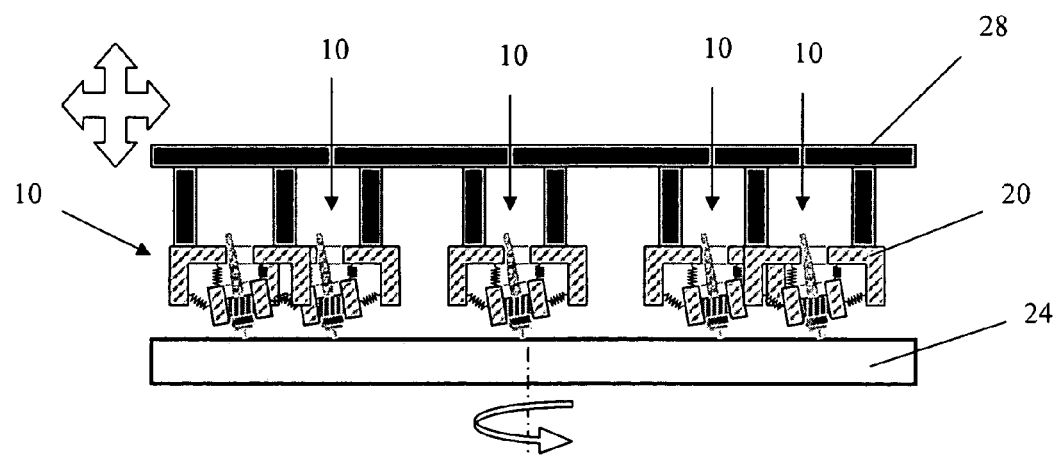
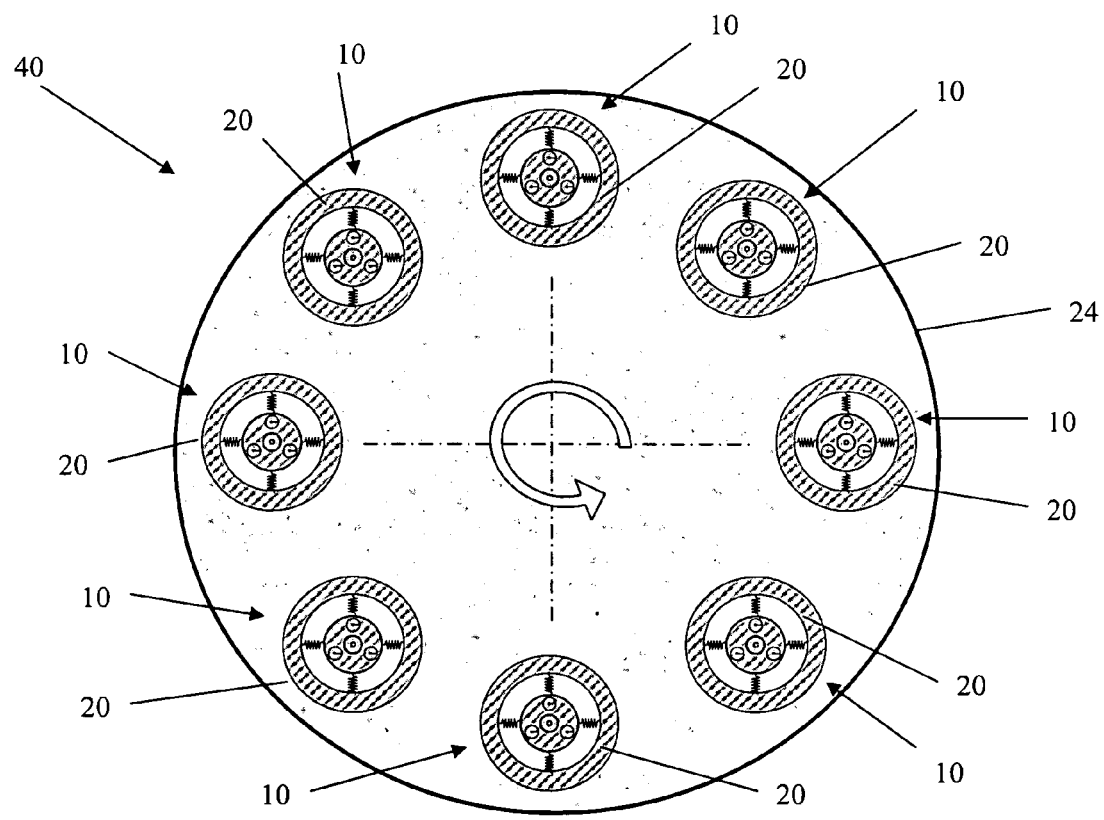
FIG. 4B

OPTICAL FIBER POLISHING AND FINISHING SYSTEM, DEVICE AND METHOD

CROSS-REFERENCES TO RELATED APPLICATIONS

This application claims the benefit of U.S. Provisional Patent Application No. 60/595,463, filed Jul. 7, 2005.

BACKGROUND OF THE INVENTION

The invention described herein relates in general to the field of industrial machinery and technology, and in particular, to systems, devices and methods for optical fiber finishing and polishing.

In recent years it has become apparent that fiber optics are steadily replacing copper wire as a means of signal transmission in a variety of applications. Fiber optics are capable of spanning long distances as well as sustaining the backbone for many network systems.

Fiber optic systems use light pulses to transmit information through optical fiber lines. Optical fibers are long, thin strands of pure glass often about the diameter of a human hair. Typically, optical fibers are arranged in bundles called optical cables to allow for a robust system. In order to preserve the signal integrity, each optical fiber end should be polished with a smooth finish free of defects. Defects, as well as other impurities and dirt, change the geometrical propagation patterns of light and consequently cause scattering. Scatter in turn compromises the integrity of optical fiber systems.

Present technologies use rotational motion to polish dome or circular shaped optical fibers and are not well suited, for example, to polish multiple fibers at the same time or actively control the orientation of the fiber tips to allow for a variable radius of curvature. An example of a current technology includes a mechanical polishing system in which a rotating wheel polishes optical fibers. This and other available systems provide adequate polishing for a flat end surface but not circular or dome shaped surfaces. In addition, such systems require multiple degrees of rotational motion of a tool to polish a dome shaped fiber, making some systems difficult to use in an efficient manner.

To polish a curved surface, typical systems use elastic pads that provide uniform pressure distribution over the surface; however, they are not well suited for polishing fibers with varying curvatures. Accordingly, such systems fail to provide robust polishing abilities, are inefficient, costly and are not available for multiple fiber applications. Therefore, what is needed is a system and method for polishing both single and multiple optical fibers at a time without multiple degrees of rotational motion of a polishing tool. What is also needed is a system and method of polishing single and multiple optical fibers with a global planar motion.

SUMMARY OF THE INVENTION

As described herein, the present invention overcomes the aforementioned limitations in an effective and efficient manner, and provides, for example, expanded use of optical fiber finishing and polishing capabilities in various applications while improving functionality and dramatically increasing production of such fibers.

A optical fiber polishing device and system are described herein, the device comprising a holder adapted to secure an optical fiber connector housing an optical fiber, an outer fixture operably connected to a first spring and a second spring, and a positional stage operably connected to the outer fixture and adapted to provide planar motion. Generally, the first spring is adapted to control angular movement of the optical fiber and the second spring is adapted to control linear movement of the optical fiber.

As further described is a method of circular end surface polishing, including programmability for variable radius of curvature and parallel processing of multiple units in an efficient and cost effective manner. The method includes securing an optical fiber connector housing an optical fiber to a holder, generating a tilting motion at an end of the optical fiber, adjusting the tilting motion of the optical fiber to create a desired optical fiber end shape; and positioning a stage to provide planar motion, wherein the stage is operably connected to the outer fixture. The tilting motion is typically provided by adjusting tension of at least one spring. The at least one is in operable connection with the holder. With more than one spring, at least one first spring is adapted to control angular movement of the optical fiber. At least one second spring is adapted to control linear movement of the optical fiber. The at least one are in operable connection with an outer fixture.

Yet still another description provided herein includes an optical fiber polishing system comprising a plurality of holders, a plurality of outer fixtures, and a positional stage operably connected to the plurality of outer fixtures and adapted to provide planar motion to the plurality of holders. Each holder is typically adapted to secure an optical fiber connector housing an optical fiber. Each outer fixture is typically in operable connection with to at least one spring. The at least one spring may include at least one first spring and at least one second spring. The at least one first spring is typically adapted to control angular movement of the optical fiber. The at least one second spring is typically adapted to control linear movement of the optical fiber.

A desired fiber optic end shape may be provided by the method, system and device described herein. Such shapes include dome, circular, or flat. Commercial applications and potential markets for the method, system and device described herein may include, for example, telecommunication industries, jewelry polishing, optical connectors and parts.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein:

FIG. 4A illustrates another schematic of an optical polishing system in accordance with an embodiment of the present invention; and FIG. 4B depicts a top view of a system for polishing multiple optical fibers in accordance with an embodiment of the present invention.

DETAILED DESCRIPTION OF THE INVENTION

Figure 1:
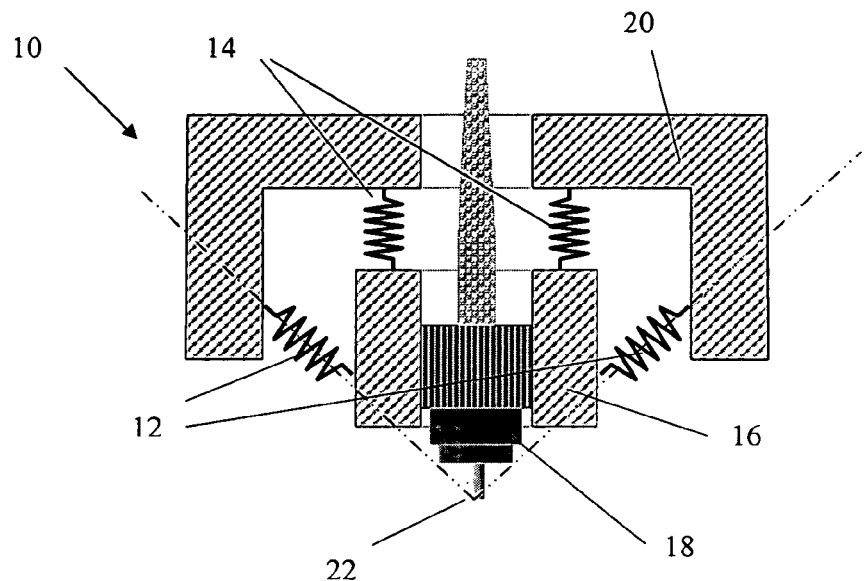
FIG. 1 depicts a simplified schematic of an optical fiber polishing system in accordance with an embodiment of the present invention.

Although making and using various embodiments are discussed in detail below, it should be appreciated that the description herein provides many inventive concepts that may be embodied in a wide variety of contexts. The specific aspects and embodiments discussed herein are merely illustrative of ways to make and use the invention, and do not limit the scope of the invention.

In the description that follows like parts are marked throughout the specification and drawing with the same reference numerals, respectively. The drawing figures are not necessarily to scale and certain features may be shown exaggerated in scale or in a somewhat generalized or schematic form in the interest of clarity and conciseness.

Referring to FIG. 1, an embodiment of an optical fiber polishing device 10 is shown. Device 10 may control the orientation of an optical fiber tip by planar motion. Device 10 includes rotational springs 12 and Z-axis springs 14.

Still referring to FIG. 1, an optical fiber gripper 16 typically holds an optical fiber connector 18 during polishing. An outer fixture 20 may be operable with and positioned and/or mounted, such as on a positional stage (not shown). Rotational springs 12 and Z-axis springs 14 are in operable connection with outer fixture 20 and optical fiber gripper 16. Device 10 and related embodiments may be used in conjunction with existing systems, components and mounts. In addition, systems and devices described herein may be operable with vision and control systems, computer hardware and computer software.

Figure 2:
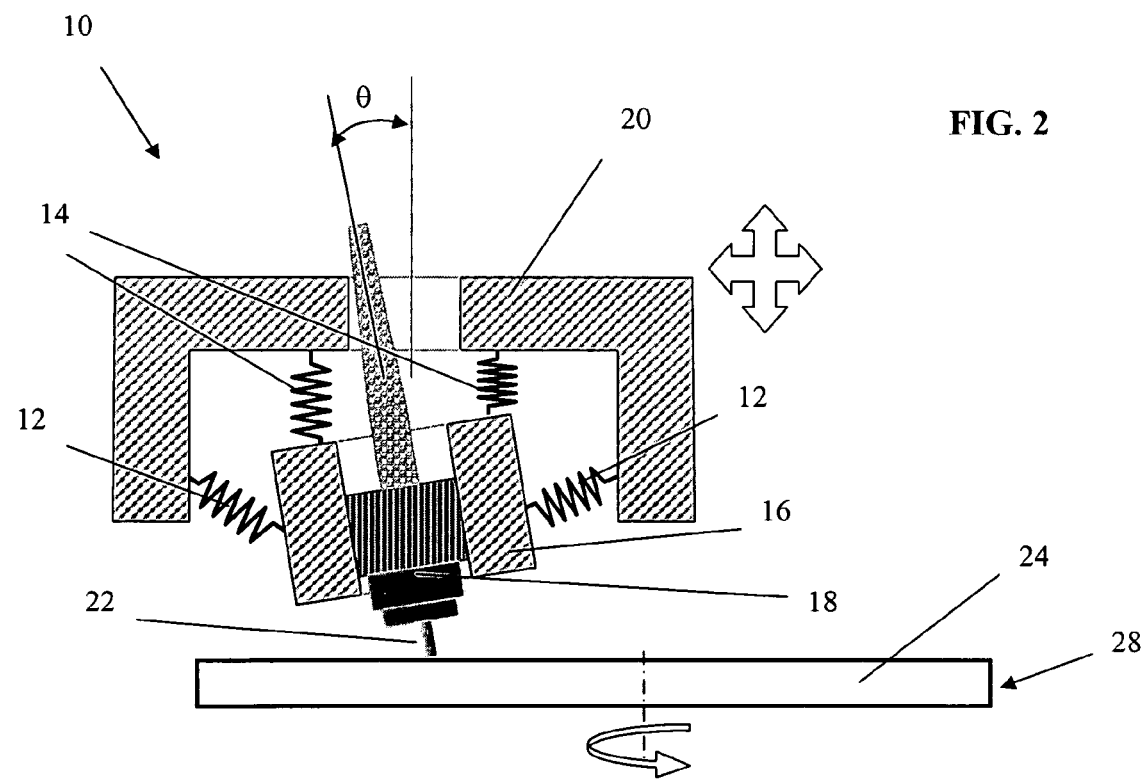
FIG. 2 illustrates a view of positional and angular flexibility in accordance with an embodiment of the present invention.

As depicted in FIG. 2, device 10 holds optical fiber connector 18 and may generate a tilting motion of an optical fiber 22 by planar (XY) motion during polishing. Rotational springs 12 are typically adjusted to provide a desired angular movement or tilting motion (⊖) at the end of optical fiber 22. Z-axis springs 14 may be similarly adjusted to provide and/or control linear movement of optical fiber 22; an adjustment is typically in the z-plane. The center of rotation is typically at the end of a fiber 22. Accordingly, a tilting angle of fiber 22 may be actively controlled by planar motion, providing positional and angular flexibility as further depicted in FIG. 2. As an example, FIG. 2 also illustrates an angular movement of optical fiber 22 induced by a planar motion at the contact point between an end of the fiber and a polishing pad 24. A desired tilting motion for any given application may be further automated by computer or other similar means as is readily apparent to one of ordinary skill in the art.

Figure 3:
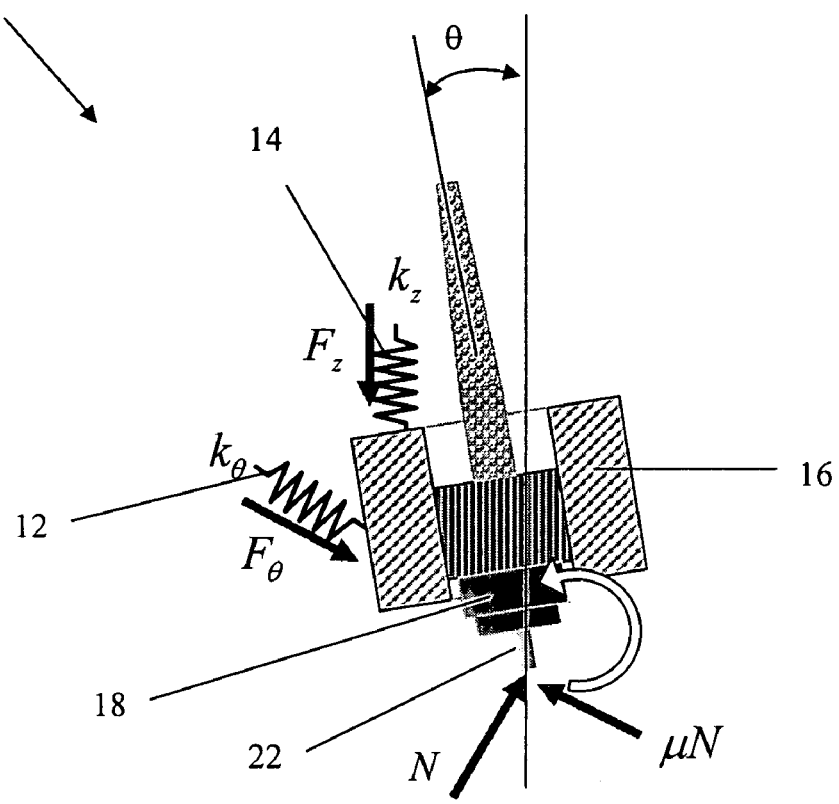
FIG. 3 depicts an exemplary free body diagram during a dome shape polishing in accordance with an embodiment of the present invention.

Rotational springs 12 and Z axis springs 14 typically provide axial polishing forces, rotational speed and friction and may be optimized as required by means known to one of ordinary skill in the art. An embodiment of this is illustrated in free body diagram 26 as shown in FIG. 3. Free body diagram 26 illustrates a number of forces provided on optical fiber gripper 16 during a polishing operation, where $F_z$ is a z-directional force, $F_\ominus$ is a force from the rotational spring, and N and $\mu N$ are normal and lateral forces, respectively, generated by friction between the end of a fiber 22 and polishing pad 24.

An angular movement may be readily generated at a contact point by appropriate adjustments in tension of rotational springs 12 and the Z-axis springs 14. Dome and circular shape polishing of one or more fibers 22 may also be performed in accordance with the embodiments described herein by at least one set of planar motions. Accordingly, system and device embodiments described herein do not require multiple degrees of rotational motion to accomplish dome shaped finishing and polishing. An optical fiber polishing device as described herein requires a planar motion to generate a tilting motion of a single fiber and/or of multiple fibers. In addition, a system and device as described herein are capable of providing circular end surface polishing and polishing of variable radius of curvatures without leaving polishing patterns.

The embodiments described herein includes a method comprising securing an optical fiber connector to at least one holder, generating a tilting motion at the end of the optical fiber, adjusting the tilting motion of the optical fiber to create the desired optical fiber end shape and positioning a stage to provide planar motion to the at least one holder. A desired tilting motion of the optical fiber is generated by adjusting tension of at least one. The at least one spring is in operable connection with the at least one holder. Further adjustments to the tilting motion may be accomplished by changing tension of the at least one attached to the holder. The at least one spring is in further operable connection with an an outer fixture. The at least one spring may include a first and second spring. The first spring (e.g., one or more first spring) is adapted to control angular movement of the optical fiber. The second spring (e.g., one or more second spring) is adapted to control linear movement of the optical fiber.

A method of providing dome shape polishing in which a center of rotation is at the end of a fiber and a device as described herein such that a geometry is provided as appropriate to afford compliance of one or more rotational springs and one or more axis springs and providing there is an appropriate axial polishing force, rotation speed and friction. Desired finishing and polishing characteristics may be further automated by computer or other similar means as is readily apparent to one of ordinary skill in the art. A desired fiber optic end shape provided by the method described herein is selected from the group consisting of a dome, circular, or flat.

Referring now to FIGS. 4A and 4B, the figures represent schematically another embodiement of the invention. FIG. 4A shows system 28 useful for finishing and polishing one or more optical fibers 22 at a given time using one global planar motion. For each optical device 10, an outer fixture 20 may be operable with and positioned on a stage and/or mount, such as a positional stage (not shown). FIG. 4A further depicts, in side view, a plurality of device 10, each of which generally comprises components as described with FIG. 1 and each of which is capable of polishing an optical fiber, thereby providing polishing and/or finishing of multiple fibers at a given time. FIG. 4B illustrates a representative schematic of system 40 having individual angular movements for each optical fiber provided with each device 10. In general, individual angular movement are provided by a single global planar motion as depicted by the rotational arrow in the center of FIG. 4B. Those skilled in the art will understand that variations on FIGS. 4A and 4B are possible in order to provide polishing and finishing of one or more optical fibers in accordance with the descriptions provided herein.

The device and system described herein provide a generally planar motion to the device and system in order to finish and/or polish the one or more optical fibers provided therein.

The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. An optical fiber polishing device comprising:
   a holder adapted to secure an optical fiber connector housing an optical fiber;

an outer fixture operably connected to at least one first spring and at least one second spring, wherein the first spring is adapted to provide angular movement of the optical fiber and the second spring is adapted to provide linear movement of the optical fiber; and a positional stage operably connected to the outer fixture and adapted to provide planar motion of the device.

2. The optical fiber polishing device of claim 1 further comprising a polishing pad accessible to the optical fiber.

3. The optical fiber polishing device of claim 2, wherein the positional stage is adapted to provide movement in the X-axis, Y-axis and Z-axis.

4. The optical fiber polishing device of claim 2, wherein the device has a center of rotation between the optical fiber and the polishing pad.

5. The optical fiber polishing device of claim 2, wherein the holder is adapted to adjust the angle between the optical fiber and the polishing pad.

6. The optical fiber polishing device of claim 1, wherein the at least one first spring is a rotational spring.

7. The optical fiber polishing device of claim 1, wherein the at least one second spring is a Z-axis spring.

8. The optical fiber polishing device of claim 1, wherein tension of the at least one first spring and the at least one second spring is adjustable.

9. The optical fiber polishing device of claim 1, wherein tension of the at least one first spring and the at least one second spring controls tilting motion of the optical fiber.

10. The optical fiber polishing device of claim 1 further comprises multiple holders.

11. The optical fiber polishing device of claim 1, wherein the device is adapted to polish multiple optical fibers with one planar motion.

12. The optical fiber polishing device of claim 1, wherein one or more portions of the device are automated.

13. A method for optical fiber polishing comprising:
securing an optical fiber connector housing an optical fiber to a holder;
generating a tilting motion at an end of the optical fiber;
adjusting the tilting motion of the optical fiber to provide a desired optical fiber end shape;
positioning a stage to provide planar motion, wherein the stage is operably connected to the outer fixture; and
wherein the tilting motion is provided by adjusting tension of at least one spring in operable connection with the holder.

14. The method of claim 13, wherein the desired fiber optic end shape is selected from the group consisting of a dome, circular, or flat.

15. The method of claim 13 further comprising polishing one or more optical fibers at a time.

16. The method of The method of claim 15, wherein polishing the one or more optical fibers is provided by a global planar motion.

17. The method of claim 13, wherein a tilting motion of the optical fiber is adjusted to provide a desired optical fiber end shape.

18. The method of claim 13, wherein positioning is automated.

19. The method of claim 13, wherein one or more steps of the method are automated.

20. A method for optical fiber polishing comprising:
securing an optical fiber connector housing an optical fiber to a holder;
generating a tilting motion at an end of the optical fiber;
adjusting the tilting motion of the optical fiber to provide a desired optical fiber end shape; and
positioning a stage to provide planar motion, wherein the stage is operably connected to the outer fixture,
wherein the tilting motion is provided by adjusting tension of at least one spring in operable connection with the holder and wherein the at least one spring further comprises at least one first spring adapted to provide angular movement of the optical fiber and at least one second spring adapted to provide linear movement of the optical fiber.

21. The method of claim 20, wherein one or more steps of the method are automated.

22. A method for optical fiber polishing comprising:
securing an optical fiber connector housing an optical fiber to a holder;
generating a tilting motion at an end of the optical fiber;
adjusting the tilting motion of the optical fiber to provide a desired optical fiber end shape; and
positioning a stage to provide planar motion, wherein the stage is operably connected to the outer fixture,
wherein the tilting motion is provided by adjusting tension of at least one spring in operable connection with the holder and wherein the at least at least one spring is in operable connection with an outer fixture.

23. The method of claim 22, wherein one or more steps of the method are automated.

24. An optical fiber polishing system comprising:
a plurality of holders, each holder adapted to secure an optical fiber connector housing an optical fiber;
a plurality of outer fixtures, each outer fixture operably connected to at least one spring, wherein the at least one spring is adapted to provide angular movement or linear movement of the optical fiber; and
a positional stage operably connected to the plurality of outer fixtures and adapted to provide planar motion to the plurality of holders, wherein the at least one spring further comprises at least one first spring and at least one second spring, wherein the at least one first spring is adapted to control angular movement of the optical fiber and the at least one second spring is adapted to control linear movement of the optical fiber.

25. The system of claim 24, wherein one or more portions of the system are automated.

* * * * *